United States Patent [19]
Pohl

[11] Patent Number: 5,520,372
[45] Date of Patent: May 28, 1996

[54] PROCESS AND DEVICE FOR PREHEATING SCRAP

[75] Inventor: Ulrich Pohl, Mülheim, Germany

[73] Assignee: Mannesmann Aktiengesellschaft, Düsseldorf, Germany

[21] Appl. No.: 252,923

[22] Filed: Jun. 2, 1994

[30]     Foreign Application Priority Data

Jun. 2, 1993 [DE] Germany ............... 43 18 935.0

[51] Int. Cl.⁶ ..................................................... C21B 7/22
[52] U.S. Cl. ..................... 266/155; 266/156; 266/901
[58] Field of Search ............................. 266/144, 155, 266/156, 901; 75/401

[56]     References Cited

U.S. PATENT DOCUMENTS

| | | | |
|---|---|---|---|
| 4,559,629 | 12/1985 | Dell'Oste | 373/80 |
| 4,692,113 | 9/1987 | Takai et al. | 266/901 |
| 5,000,425 | 3/1991 | Brändström | 266/156 |

FOREIGN PATENT DOCUMENTS

| | | | |
|---|---|---|---|
| 3521569 | 12/1986 | Germany | 266/901 |
| 8908810 | 9/1989 | WIPO | 266/155 |

*Primary Examiner*—Scott Kastler
*Attorney, Agent, or Firm*—Cohen, Pontani, Lieberman, Pavane

[57] ABSTRACT

A process and installation for preheating scrap containing organic matter, in which flue gas is afterburned in an afterburner combustion chamber at a temperature at more than 1200° C. The after-burned hot flue gases are guided, without being cleaned, via a heat exchanger. Fresh intake air is heated in the heat exchanger by sensible heat of the after-burned hot flue gases. A first portion of the heated intake air at a temperature above an ignition temperature of organic matter is guided in adjustable amounts through at least one basket filled with scrap. Another portion of the heated air exiting the heat exchanger is made available in adjustable quantities to the afterburner as hot blast and/or mixed in the another portion of heated intake air with the after-burned hot flue gases.

8 Claims, 1 Drawing Sheet

PROCESS AND DEVICE FOR PREHEATING SCRAP

BACKGROUND OF THE INVENTION

1. Field of the Invention

The invention is directed to a process for preheating scrap in which gaseous media are heated by the sensible heat of flue gas which is after-burned in a combustion chamber and cleaned in a filter. The invention is further directed to a device for carrying out this process.

2. Description of the Prior Art

In steel production, attempts are generally made to exploit the energy generated in the production process to the fullest extent possible. This includes the use of sensible heat from scrap melting furnaces for preheating burden, in particular scrap.

The scrap used in steel works, depending on provenance, contains varying amounts of organic components, e.g. coats of paint, adhering oil, remainders of textile, plastic or cable, particularly in scrap from automobiles or similar sources, as well as paper, plastic and wood which end up in the scrap in the course of collection and turnover.

In a steel production installation known from DE 30 38 515 A1, thermal energy of the waste gases of an electric furnace is used for preheating materials such as scrap, iron and iron alloys. In so doing, the flue gas exiting the furnace arrives in a combustion chamber and is then fed directly to the burden located in the charging bucket via a bypass line or a transmission line. A disadvantage of this process is that unburned or partially burned noxious matter and toxic components escape from the melting furnace and from the scrap preheater connected in series with the furnace.

A process and a device for preheating materials by hot flue gases is known from EP 0 078 446 A1, wherein contact between the preheating material and the flue gas is prevented. It is suggested herein to connect the flue gas line with a heat exchanger and to connect the secondary side of the heat exchanger with a preheating oven via a feedline and a return line. Further, in order to increase rapid circulation of the heat exchanging medium, a circulating unit is suggested for accelerating the movement of the medium, i.e. air or protective gas, circulating through the system. A disadvantage in this known process is a progressively increasing charging of the recirculated air with noxious matter from the burden heated in the preheating station.

Furthermore, in a process and an installation for preheating scrap to be introduced into an electric furnace known from DE 35 21 569, the preheating gas is guided through a scrap basket and a partial flow of the preheating gas based on the charging of the preheating gas in the preheating circuit with noxious substances and water vapor is mixed in with the furnace gases in the hot region of these furnace gases where the noxious substances burn. The amount of preheating gas that corresponds to the partial flow is replaced by fresh preheating gas. In a preferred arrangement, air is used as the preheating gas and the air guided in the circuit is charged with organic and inorganic substances which are absorbed from the scrap and which carbonize already at relatively low temperatures.

The above-mentioned processes known from operating practice for preheating scrap in electric steel works by means of the hot dust-laden waste gases from the electric arc furnace have the following disadvantage in particular. The waste gases contain oxygen in varying proportions. In the preheating of scrap, the gases cool off and exit the scrap preheating device as heating commences at a low temperature which increases in the course of the heating process. The combustible components are evaporated or carbonized until reaching the ignition temperature for the contained combustible components, since the oxygen content of the waste gas is not sufficient for combustion. In so doing, unburned carbonizing gases and organic pollutants such as dioxin and furan are formed. In order to prevent environmental loading, the waste gas released from the scrap is first heated by adding sufficient amounts of oxygen until the unburned components are reliably burned as well. Often, a portion of the waste gas from the smelting unit is used for this purpose, so that its energy is not available for preheating scrap. Accordingly, the occurring dioxins and furans are not destroyed and must be removed by means of activated coal or catalysts.

The combustion residues (fly ashes) combine with and contaminate the metallurgic dusts occurring in the melting vessel when melting scrap. Owing to the formation of dioxin and furan when preheating scrap, the dusts collected in the filter are also contaminated. In countries having stricter environmental legislation, the disadvantages resulting from the conventional preheating of scrap described above have prevented such preheating of scrap, although it is highly desirable for energy-related reasons.

SUMMARY OF THE INVENTION

Accordingly, it is an object of the present invention to provide a process and a device for preheating scrap which prevent the aforementioned disadvantages and in which the sensible heat of the flue gases is exploited to the fullest extent, and in which dioxins and furans occurring during the preheating process are eliminated in a simple manner.

Pursuant to these objects, and others which will become apparent hereafter, one aspect of the present invention resides in a process for preheating scrap in which the flue gases are after-burned at a temperature of more than 1200° C. The after-burned hot gases are guided, without being cleaned, via a heat exchanger. Fresh intake air is heated in the heat exchanger by the sensible heat of the after-burned hot gases. A first portion of the heated intake air, at a temperature above an ignition temperature of organic matter in the scrap, is guided in adjustable amounts through at least one basket filled with scrap. Finally, another portion of the heated intake air which is exiting the heat exchanger is made available in adjustable quantities to the after burner as hot blast and/or is mixed in with the after-burned hot gases.

Another aspect of the present invention resides in an installation for preheating the scrap pursuant to the inventive method. The installation includes a scrap melting furnace, a first combustion chamber in which the flue gas of the furnace can be after-burned, at least one scrap preheating station having at least one scrap basket, and a filter device which is connected with the first combustion chamber via a flue gas line. A first heat exchanger is provided in the flue gas line between the first combustion chamber and the filter device. A first fresh air line is connected to the scrap preheating station and is guided through the first heat exchanger. A waste gas line is connected to the scrap basket and leads to a second combustion chamber which is separate from the first combustion chamber and through which the flue gas of the scrap preheating station can be guided. A second heat exchanger is provided downstream of the second combustion chamber in a flow direction and a second fresh air line is guided through the second heat exchanger and connected to the scrap preheating station in parallel or so as to alternate with the first fresh air line.

In the process according to the invention, fresh air is heated via a heat exchanger by means of flue gas to a temperature above the ignition temperature of organic materials. This air at a temperature of more than 500° C. is supplied to one or more scrap baskets which are filled with scrap and are connected in parallel. The hot air is preferably introduced at the base of the scrap basket. At the start of the heating process, the hot air is cooled at the scrap which is at first cold. Until the ignition temperature for contained organic components such as plastic, paint residues, oils and the like has been reached, these components are only evaporated and exit from the scrap with the cooled air without being burned. The air-gas mixture emerging from the scrap preheating station is fed to a common combustion chamber in which complete combustion is effected at temperatures above 1200° C.

When the ignition temperature for the organic components in the scrap is reached, these components burn completely or at least extensively already in the scrap basket and release thermal energy directly to the scrap. Any unburned components are burned in the combustion chamber for the flue gas of the scrap preheating process, which combustion chamber is provided separately from the combustion chamber of the arc furnace. At a combustion temperature of more than 1200° C., dioxins and furans which are still present are completely destroyed.

The thermal energy of the hot exhaust gases at temperatures above 1200° C. which is generated by the burning of combustible components in the scrap is used for heating the amount of air necessary for preheating the scrap to approximately 500° to 600° C. If the scrap still contains insufficiently combustible components, heating air can also be generated by recuperating heat exchange with the exhaust gas of the melting furnace. In another embodiment, additional fuel can be fed to the combustion chamber.

The waste gas from the scrap preheating process exiting the heat exchanger is fed to a separate filter independently of the waste gas from the melting vessel. The filter inlet temperature is likewise lowered by mixing in cold air. Dusts composed substantially of impurities adhering to the scrap and of combustion residues (fly ash) are collected in this separate filter. These dusts, which contain many chlorides and alkalis which limit the processability of metallurgic dusts, differ from the metallurgic dusts occurring in the melting vessel when melting scrap.

When two or more scrap preheating baskets connected in parallel are used in the scrap preheating station, the preheating process need not be interrupted in order to remove a heated scrap basket or insert a cold scrap basket. As a result of the overlapping heating processes, the composition of the mixture of waste gases flowing from the scrap baskets into the combustion chamber for afterburning is homogenized.

The flue gas exiting from the combustion chamber is free of toxic and organic substances and can be used for further exploitation of energy for maintaining heat in scrap baskets which have already been preheated, as well as for further heating.

The heated scrap charged in the arc is clean; that is, free of adhering impurities and combustible components. Therefore, the charging of the furnace vessel does not lead to the usual large quantities of surge gas with shooting flames. Accordingly, there is no need for a costly gas detection system for the inventive process or for exhaust capacities.

Since there are no longer any combustible components in the scrap and the chlorine necessary for the formation of dioxins and furans is also eliminated by removing the combustion residues, the waste gas from the melting furnace can also be used without restrictions for recuperating energy. The inventive process also makes a recombination of dioxins and furans impossible.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

An embodiment of the invention is schematically shown in the accompanying drawing.

DETAILED DESCRIPTION OF THE PREFERRED EMBODIMENTS

Figure 1:
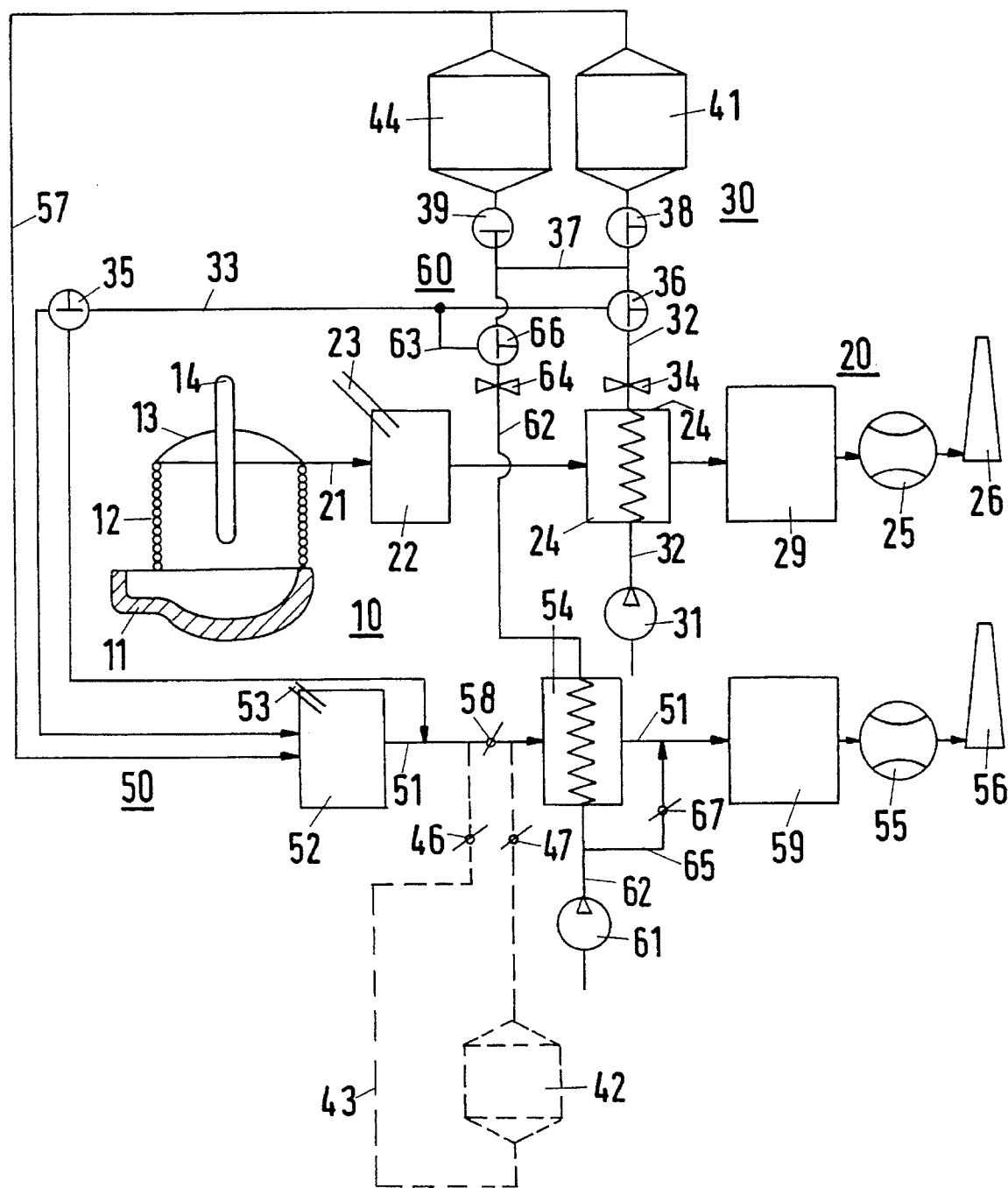

FIG. 1 schematically shows a scrap melting furnace 10 which has a lower furnace vessel 11 and an upper furnace vessel 12 and is covered by a furnace hood 13. At least one electrode 14 is guided through the furnace hood 13 and projects into the upper furnace vessel 12. A flue gas flow control 20 is connected at the upper end of the upper furnace vessel 12 with a flue gas line 21 leading to a combustion chamber 22. A fuel gas feed 23, not shown in more detail, is connected to the combustion chamber 22.

A heat exchanger 24 connected to a filter device 29 is also provided in the flue gas line 21. The flue gas is removed from the system by an exhaust fan 25 and is released into the atmosphere via a stack 26.

A hot air device 30 having a compressor 31 which carries fresh air into a fresh air line 32 is connected with the heat exchanger 24. A shut-off gate 34 and a fitting 36 are provided in the fresh air line 32 in the direction of flow. The heated air can be guided by means of the fitting 36 into a branch line 33 on the one hand and into a scrap basket 41 on the other hand or via a connection line 37 into a scrap basket 44 connected in parallel. Fittings 38 and 39 are provided in the scrap baskets 41 and 44 in order to shut off the feedline and discharge line when changing baskets.

The flue gas of the scrap basket or scrap baskets 41, 44 is fed to a combustion chamber 52 of a flue gas flow control 50 of the scrap basket via a flue gas line 57. Further, the combustion chamber 52 is connected to a fuel gas feed 53 and to the branch line 33 connected with the fresh air line 32.

The flue gas exits the combustion chamber 52 via a flue gas line 51 by means of an exhaust fan 55 via a heat exchanger 54 and is released into the atmosphere through a filter 59 at the stack 56.

A hot air device 60 having a compressor 61 which moves fresh air into a fresh air line 62 is connected with the heat exchanger 54. The fresh air line 62 has a shut-off gate 64 and a fitting 66, by which it is connected via a branch line 63 with the branch line 33, and opens into the scrap baskets 41 and 44 as does the fresh air line 32.

Another fitting 35 is provided in the branch line 33 and heating air can be fed into the flue gas line in the direction of flow downstream of the combustion chamber 52.

Additionally, a bypass line 65 is provided with a shut-off 67 at the fresh air line 62 upstream of the heat exchanger 54. Cold air can be mixed in with the hot flue gases in the flue gas line 51 upstream of the filter 59 by means of this shut-off 67.

Another scrap basket 42 can be connected to the flue gas line 51 between the combustion chamber 52 and the heat exchanger 54 via a line 43. A shut-off valve 58 in the flue gas line 51 and shut-off valves 46 and 47 in the bypass line 43 are provided for diverting the flue gas to the scrap basket.

The invention is not limited by the embodiments described above which are presented as examples only but can be modified in various ways within the scope of protection defined by the appended patent claims.

I claim:

1. An installation for preheating scrap, comprising: a scrap melting furnace; a first combustion chamber in which flue gas of the furnace is after-burned; at least one scrap preheating station having at least one scrap basket; a filter device; a first flue gas line that connects the first combustion chamber with the filter device; a first heat exchanger provided in the first flue gas line between the first combustion chamber and the filter device; a first fresh air line connected to the at least one scrap preheating station having at least one scrap basket and guided through the first heat exchanger; a second combustion chamber arranged separately from the first combustion chamber; a waste gas line connected to the second combustion chamber and the at least one scrap basket so that flue gas of the at least one scrap preheating station is guidable therein; a second heat exchanger provided downstream of the second combustion chamber in a flow direction; and a second fresh air line connected to the at least one scrap preheating station and guided through the second heat exchanger.

2. An installation according to claim 1, wherein the second fresh air line is connected in parallel to the first fresh air line.

3. An installation according to claim 1, wherein the second fresh air line is connected to the at least one scrap preheating station so as to alternate with the first fresh air line.

4. An installation according to claim 1, wherein the at least one scrap preheating station includes a first scrap basket arranged parallel to a second scrap basket, and further comprising means for switching between individual operation and parallel operation of the scrap baskets.

5. An installation according to claim 1, and further comprising shut-off gates provided in the fresh air lines.

6. An installation according to claim 1, and further comprising means arranged in the first and second fresh air lines for guiding heated fresh air to at least one of the at least one scrap basket, the second combustion chamber and a flue gas line downstream of the second combustion chamber.

7. An installation according to claim 1, and further comprising a second flue gas line downstream of the second combustion chamber, another scrap basket, a bypass line that connects the another scrap basket to the second flue gas line, and switching means for connecting the another scrap basket to the second flue gas line.

8. An installation according to claim 7, wherein the bypass line is connected to the second flue gas line in a region between the second combustion chamber and the second heat exchanger.

* * * * *